US010341166B2

(12) United States Patent
Oulahal et al.

(10) Patent No.: US 10,341,166 B2
(45) Date of Patent: Jul. 2, 2019

(54) METHOD FOR ADMINISTERING A PLURALITY OF LOCAL DEVICES

(71) Applicant: ORANGE, Paris (FR)

(72) Inventors: Nordine Oulahal, Grenoble (FR); Jean-Didier Ott, Crolles (FR)

(73) Assignee: Orange, Paris (FR)

(*) Notice: Subject to any disclaimer, the term of this patent is extended or adjusted under 35 U.S.C. 154(b) by 71 days.

(21) Appl. No.: 15/025,849

(22) PCT Filed: Sep. 25, 2014

(86) PCT No.: PCT/FR2014/052410
§ 371 (c)(1),
(2) Date: Mar. 29, 2016

(87) PCT Pub. No.: WO2015/044600
PCT Pub. Date: Apr. 2, 2015

(65) Prior Publication Data
US 2016/0248621 A1     Aug. 25, 2016

(30) Foreign Application Priority Data

Sep. 30, 2013 (FR) ...................................... 13 59445

(51) Int. Cl.
*H04L 12/24* (2006.01)
*H04L 29/08* (2006.01)

(52) U.S. Cl.
CPC ........ *H04L 41/046* (2013.01); *H04L 41/0823* (2013.01); *H04L 67/025* (2013.01)

(58) Field of Classification Search
CPC .............................. H04L 41/08; H04L 67/025
(Continued)

(56) References Cited

U.S. PATENT DOCUMENTS

2013/0046865 A1* 2/2013 Liu ..................... H04L 41/0803
709/220
2014/0115177 A1    4/2014 Wu

FOREIGN PATENT DOCUMENTS

CN          101 808 024 A     8/2010
WO    WO 2013/029507 A     3/2013

OTHER PUBLICATIONS

Cruz et al; "How to Provision and Manage Off-the-Shelf SIP Phones in Domestic and SOHO Environments"; 2011; IEEE; pp. 42-49.*
(Continued)

*Primary Examiner* — Glenford J Madamba
(74) *Attorney, Agent, or Firm* — Knobbe, Martens, Olson & Bear, LLP

(57) ABSTRACT

One embodiment relates to a method for administering a plurality of local devices connected to a local communication network wherein the method is carried out by a local configuration device LACS able to be connected to the local communication network and to a remote configuration device ACS. The method may comprise receiving, from the remote configuration device ACS, a command for administering an administration act, wherein the administration act comprises a service which may be executed on the local communication network. A list of the local devices involved in the execution of the administration act may be determined for the command. At least one administration command for executing the administration act on the local communication network may be transmitted to each of the local devices from the determined list.

11 Claims, 8 Drawing Sheets

(58) Field of Classification Search
USPC .......................................................... 709/223
See application file for complete search history.

(56) References Cited

OTHER PUBLICATIONS

French Search Report dated Jul. 10, 2014 for French Application No. FR 1359445 filed Sep. 30, 2013.
Cruz et al. 2011. How to Provision and Manage Off-the-Shelf SIP Phones in Domestic and SOHO Environments. 36th Annual Conference on Local Computer Networks, 978-1-61284-928-7/11 pp. 42-49.
DSLHome—Technical Working Group. May 2004. Technical Report—DSL Forum TR-069, CPE WAN Management Protocol. J. Bernstein & T. Spets (Eds.),109 pages.
DSLHome—Technical Working Group. Sep. 2005. Technical Report—DSL Forum TR-106, DSLHome™ Data Model Template for TR-069-Enabled Devices. J. Bernstein, T. Spets, & C. Bouchat (Eds.), 30 pages.
IEEE Computer Society. 2012. IEEE Standard for Information technology—Telecommunications and information exchange between systems, Local and metropolitan area networks—Specific requirements, Part 11: Wireless LAN Medium Access Control (MAC) and Physical Layer (PHY) Specifications. IEEE Std 802.11™-2012 (Revision of IEEE Std 802.11-2007), 2793 pages.
IEEE Computer Society. 2013. IEEE Standard for Management Information Base (MIB) Definitions for Ethernet. IEEE Std 802.3.1™-2013 (Revision of IEEE Std 802.3.1.-2011), 415 pages.
International Search Report dated Dec. 18, 2014 for PCT/FR2014/052410 filed Sep. 25, 2014, 7 pages.
Written Opinion of the International Search Authority dated Dec. 18, 2014 for PCT/FR2014/052410 filed Sep. 25, 2014, 6 pages.

\* cited by examiner

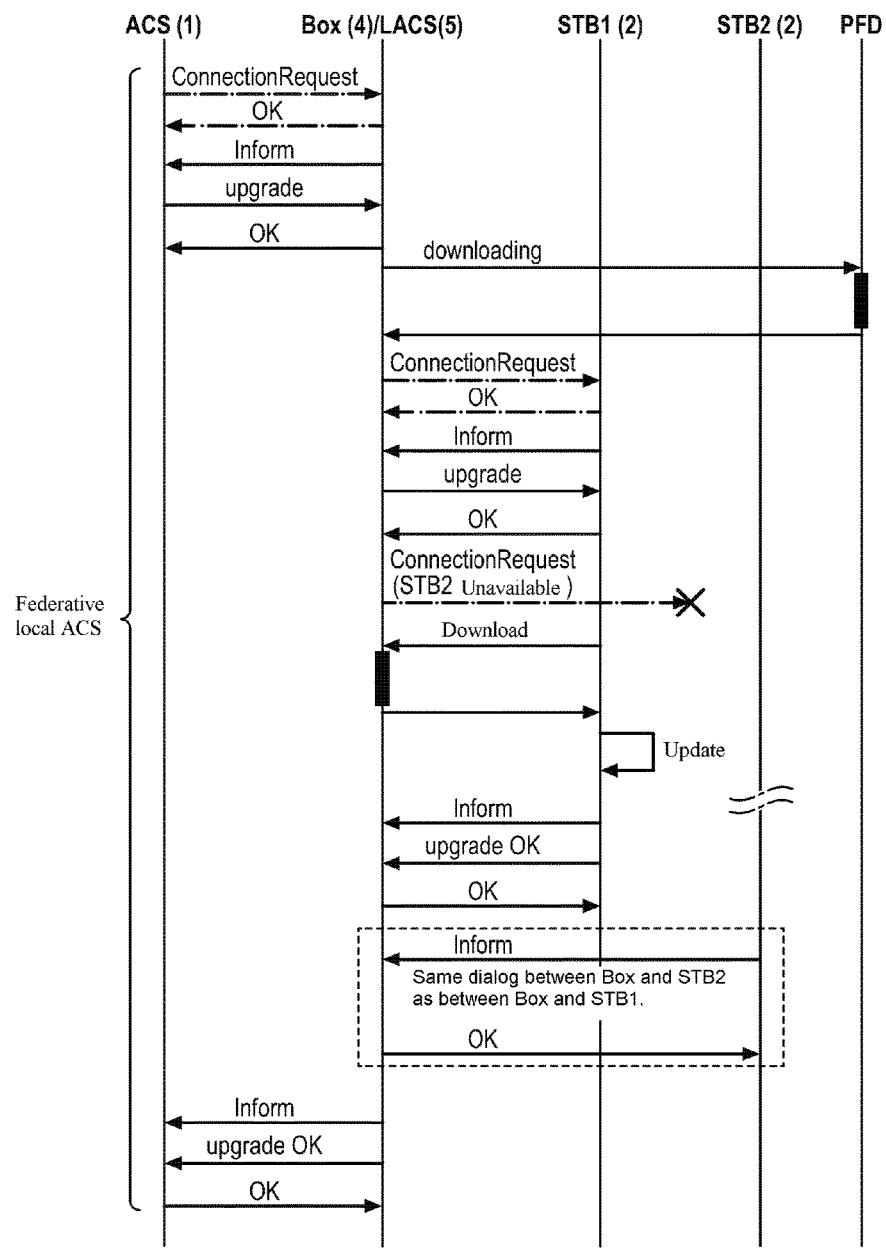

METHOD FOR ADMINISTERING A PLURALITY OF LOCAL DEVICES

RELATED APPLICATIONS

This application is the U.S. National Phase of Application No. PCT/FR2014/052410 entitled "METHOD FOR ADMINISTERING A PLURALITY OF LOCAL DEVICES" filed Sep. 25, 2014, which designated the United States, and which claims the benefit of French Application No. 1359445, filed Sep. 30, 2013.

GENERAL TECHNICAL FIELD

The object of the invention is the remote administration of devices of a local network.

It more particularly relates to remote administration of such devices with a configuration device, such as a self-configuration server ACS (Auto Configuration Server), through a device of the local network supporting the role of a local configuration device.

STATE OF THE ART

Present home networks comprise an increasing number of connected pieces of equipment (or CPE for "Customer Premise Equipment"), increasingly proposing services accessible from the outside of the home network, for example for home automation applications, multimedia content broadcast applications, etc. It is therefore necessary to offer an efficient solution for remotely administering such devices of a home network. The operator of the network to which such a home network is connected should notably be able to detect the devices of the home network, monitor their operation and measure their performances, diagnose possible malfunctions, update the software packages loaded on board these devices and install and configure new services.

The CWMP ("CPE WAN Management Protocol") protocol defined by the technical report TR-069 of the Broadband Forum gives the possibility of administering all the pieces of equipment connected to a remote home network. Indeed, it proposes mechanisms allowing automatic configuration of such devices and their management by means of an Auto Configuration Server ACS. The protocol notably gives the possibility of updating software packages on-board these pieces of equipment, measuring their performances and diagnosing failures.

The ACS server 1 customarily accesses the devices 2 of a home network 3 through the gateway 4 of the home network 3 as illustrated in FIG. 1. This gateway, or any other device of the home network, may play the role of a proxy for the CWMP protocol between the ACS server 1 and some of the devices of the home network. Such an approach for example gives the possibility of administering from the ACS server, devices which do not natively support the CWMP protocol but another management protocol, such as the UPnP DM ("Universal Plug and Play Device Management") protocol. The so-called "embedded device" model may notably be used for representing a device 2 (D1) of the home network 3 with respect to the ACS server 1 by the service (srv1) which it may provide as illustrated in FIG. 2a.

Nevertheless, administration by an ACS server according to the CWMP protocol of a modern home network comprises a larger number of intermittently connected devices, used with variable frequency, sometimes jointly used for executing a single service and however not necessarily provided with advanced administration functions, requires, in order to be efficient, the installation of a complex software environment both on the ACS service itself and on the devices of the home network, notably the gateway of this network.

Thus, updating of microcode ("firmware") of a device without causing inconvenience for the user requires the installation of a piece of software implementing optional functions of the CWMP protocol on this device, such as the "Schedule Download" function for downloading the new microcode to be installed. Also, real time access to the devices 2 of the home network 3 by the ACS server 1 through the gateway 4 of the network requires the installation of specific functions on these devices 2 and on the gateway 4 or else the setting into place of a complex architecture based on protocols such as STUN (for "Simple Traversal of UDP through NATs") or XMPP (for "Extensible Messaging and Presence Protocol") for example. Similarly, the configuration of services executed in parallel or in alternation on several devices of the home network of various natures requires the programming of complex behaviours, specific to each service, on the ACS server 1 and the detailed knowledge by the ACS server 1 of the structure of the home network 3.

Therefore there exists a need for a solution for remote administration of a local network by an ACS server which is complete and efficient and does not require the programming of additional functions to those of the CWMP protocol or on the ACS server or on each of the devices of the home network to be administered.

PRESENTATION OF THE INVENTION

The invention according to a first aspect thus relates to a method for administering a plurality of local devices connected to a local communications network,
characterized in that it comprises the following steps applied by a local configuration device LACS able to be connected to the local communications network on the one hand and to a remote configuration device ACS on the other hand:
 receiving from the remote configuration device ACS a command for administering a service which may be executed on the local communications network, said service being called administration act,
 determining for said command a list of local devices involved in the execution of said administration act,
 transmitting to each of the local devices from said determined list at least one administration command required for executing said administration act on the local communications network.

Such a solution gives the possibility to the remote configuration device ACS of administering the whole of the local devices of the local communications network without having to connect to each of them through the gateway for accessing the local network. Further, this solution gives the possibility of not having to implement a complex control logic in the remote configuration device even when various local devices have to cooperate for executing a service. This solution also gives the possibility of reducing the load of the remote configuration device when the local network comprises several devices of a same type.

According to advantageous and non-limiting features, the method according to the first aspect may comprise, applied by said local configuration device LACS, the step of:
 making available to the remote configuration device ACS a model of the local communications network allowing the remote configuration device ACS to determine the administration acts of services which may be executed on the local communications network, and associated parameters.

The use of such a model gives the possibility of exhibiting to the remote configuration device ACS the administration acts of services which may be executed on the whole of the local communications network and the associated parameters, as a known structure of the remote configuration device since it is compliant with the CWMP standard, without needing to exhibit to the remote configuration device the detail of the local devices making up the local network and participating in the execution of these administration acts.

According to other advantageous and non-limiting features, the local configuration device LACS associates a microcode ("firmware") with each local device of the local communications network.

This allows it, upon updating a microcode, to determine which local devices having this microcode on board are concerned by this updating.

Further, upon connecting to the local communications network of a new local device which may be involved in the execution of at least one administration act, said local configuration device LACS updates the model of the local communications network in order to allow the remote configuration device ACS to have an update of the administration acts of the services which may be executed on the local communications network and of the associated parameters.

The model of the local network is thus maintained updated which allows the remote configuration device to be informed on the new available administration acts and of parameters related to the presence of the new local device, without needing to declare to the remote configuration device the addition of said new local device in the local communications network.

Executing the administration act triggers an installation or an update of a piece of software or of a microcode ("firmware"), a configuration of a service, a tracking of the state of performances and/or a diagnosis of a failure of one or several local devices of the local communications network.

The use of a local configuration device and of a global model of the local network in such a context of use gives the possibility to the remote configuration device of controlling such an administration act in the whole of the local network without having to multiply connections and commands since it only interacts with the local configuration device according to the global commands of the model of the network. Further, the proposed solution also gives the possibility to the distant configuration device of always having a global vision of the status of each service since the local configuration device may provide such a piece of information even when other local devices of the local communications network are switched off or inaccessible.

When the administration act of a service is a command for installing or updating a piece of software or a microcode on the local communications network, said local configuration device LACS downloads said piece of software or said microcode, and said at least one administration command required for executing said administration act comprises a command for downloading from said local configuration device and for installing said piece of software or said microcode, transmitted to the local devices on which the installation or the updating of said piece of software of said microcode is required.

This gives the possibility of only carrying out a single download towards the local network, reducing the consumed band pass by the whole of the local devices. Further, the downloading of said piece of software or said microcode by the local devices may be achieved when the latter have the required pass band or outside the periods of use of these devices in order to carry out updates without disturbing the users.

When the administration act of a service is a command for configuring a service, said at least one administration command required for executing said administration act is an administration command configuring said service on the local devices from the determined list.

The presence of the local configuration device discharges the remote configuration device and makes it possible for it to only have a single intermediary by limiting the number of exchanges for achieving such a configuration of a service on the local communications network. Further, the transmission to the local devices of the administration commands may be accomplished in a desynchronized way and deferred so that the execution of these commands occur at a more appropriate moment, for example so as not to disturb the user of the local network.

Moreover, the connection between the local configuration device LACS and the remote configuration device ACS may be secured.

The use of a local configuration device having sufficient resources for applying such a safety mechanism gives the possibility of securing the whole of the communications between the remote configuration device and the local communications network, which is not always possible when the remote configuration device converses directly with local devices sometimes incapable of applying any safety mechanism.

The local configuration device LACS may be integrated into a gateway of the local communications network.

This gives the possibility to the local configuration device of being naturally connected to the whole of the local devices, of having sufficient processing power and remaining permanently operating.

According to a second aspect, the invention relates to a computer program product comprising code instructions for executing a method for administering a plurality of local devices according to the first aspect when this program is executed by a processor.

According to a third aspect, the invention relates to a local configuration device LACS capable of being connected to a local communications network and to a remote configuration device ACS and configured for:
  receiving from the remote configuration device ACS a command for administering a service which may be executed on the local communications network, a so called administration act,
  determining for said command a list of the local devices involved in the execution of said administration act,
  transmitting to each of the local devices from said determined list at least one administration command required for executing said administration act on the local communications network.

According to a fourth aspect, the invention relates to a gateway capable of being connected to a local communications network and comprising a local configuration device LACS according to the third aspect.

Such computer program products, local configuration device and gateway have the same advantages as those mentioned for the method according to the first aspect.

PRESENTATION OF THE FIGURES

Other features and advantages of the present invention will become apparent upon reading the description which follows of an embodiment of the invention. This description will be given with reference to the appended drawings wherein:

FIGS. 5a and 5b are diagrams schematizing a second example for applying an administration method according to the state of the art and an embodiment of the invention;

Figure 6A:
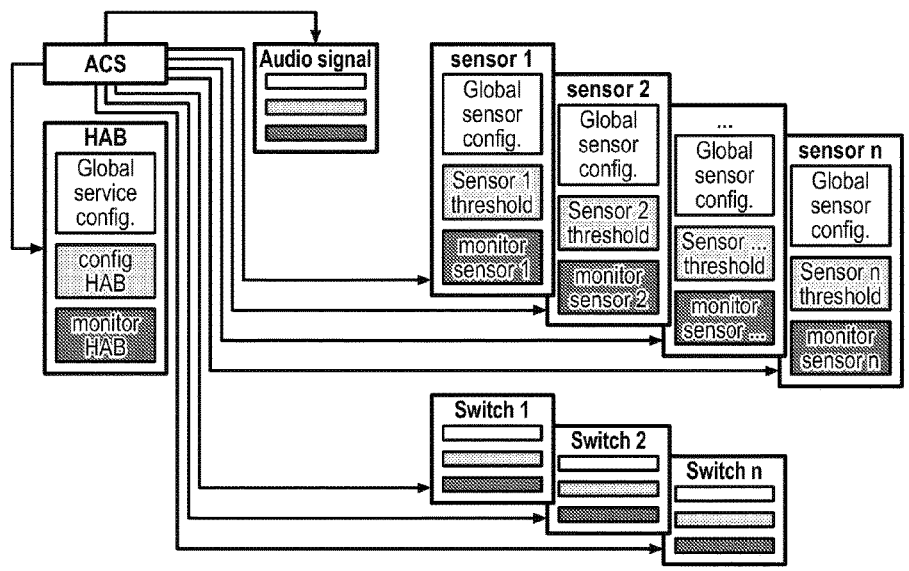
Figure 6B:
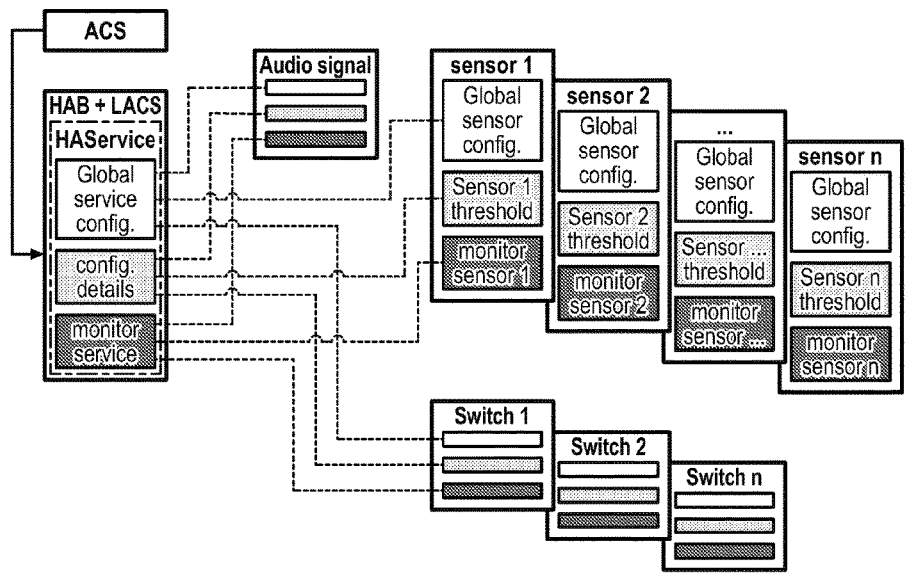

FIGS. 6a and 6b schematize a third example for applying an administration method according to the state of the art and an embodiment of the invention.

DETAILED DESCRIPTION

Architecture

Figure 3:
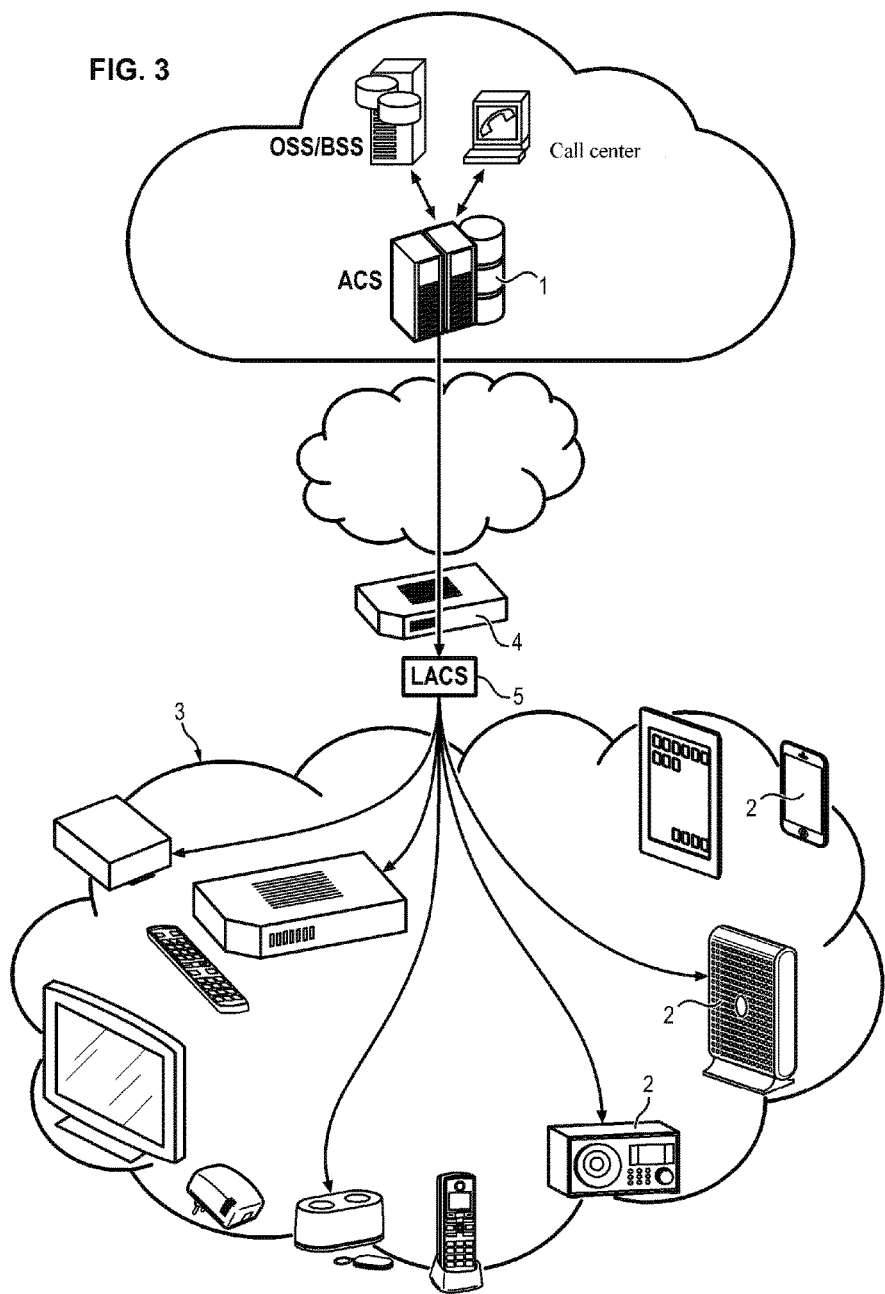
FIG. 3 illustrates an example of an architecture for applying an administration method according to an embodiment of the invention.

With reference to FIG. 3, an embodiment of the invention relates to a method for administering a plurality of local devices 2 connected to a local communications network 3.

By local communications network 3, is meant a network of the LAN ("Local Access Network") type. This network may in particular be a home network or a corporate network, and is most often centered on a gateway 4 for accessing the local network, which in particular is a box for accessing Internet of the home or of the corporation.

The network 3 may both be a wired network of the Ethernet type, according to the IEEE 802.3 standard, and a wireless network of the Wi-Fi type according to the IEEE 802.11 standard, and a hybrid network according to the P1905 or 3G network or else a combination of the preceding networks. The link may be direct, or may use an intermediate device such as CPL boxes.

The local devices 2 may be any devices, in particular home devices, having a wired or wireless network connection. For example, these devices may be computers, a multimedia box ("Set-Top Box"), a gateway, a touch pad, consoles, smartphones, electrical appliances, etc.

The administration of the local devices 2 of the local communications network 3 is carried out by a remote configuration device 1, located outside the latter and connected to the local communications network via the gateway 4. The remote configuration device is a server of the ACS ("Auto Configuration Server") type, conversing with the local network for its configuration according to the remote management protocol CWMP ("CPE WAN Management Protocol") defined by the technical report TR-069 from the Broadband Forum. The server 1 uses the CWMP protocol for obtaining and managing the state of the local network, initiating diagnostic tests, downloading files and managing events.

This method differs from known methods in that the administration of the local devices 2 of the local communications network 3 is carried out locally by a local configuration device LACS 5 capable of being connected to the local communications network 3 on the one hand and to the remote configuration device ACS 1 on the other hand.

The local configuration device 5 may consist in a dedicated device of the local communications network 3, or else be integrated into one of the devices 2 of the local network 3, in particular in the gateway 4 of the network. The gateway is by definition the core of a local communications network. All the other devices of the network are connected to it and it already exchanges messages with these devices because of its routing function. This device is actually the one which controls the network, and therefore has a coordinator position. Further, it is much less often switched off than the other ones (since it often ensures connectivity to the Internet network 24 hours a day). Moreover it generally has sufficient processing means for carrying out the operations performed by the local configuration device LACS. It is thus particularly adapted for administering the other devices of the local network.

The local configuration device 5 is adapted so as to be the single intermediary of the distant configuration device ACS 1 for the configuration of the local network 3. The remote configuration device ACS 1 is never in direct communication with the other local devices 2 of the local network 3 and is not even aware of the structure of the local network and of the existence of the local devices 2 of the local network.

The connection between the local configuration device 5 LACS and the remote configuration device ACS 1 may be secured by means of safety mechanisms, notably provided by the CWMP protocol, for example by means of the HTTPS protocol. The use of a local configuration device 5 having sufficient resources for applying such a safety mechanism gives the possibility of securing the whole of the communications between the remote configuration device 1 and the local communications network 3, which is not always possible when the remote configuration device directly converses with local devices sometimes incapable of applying any safety mechanism.

Figure 1:
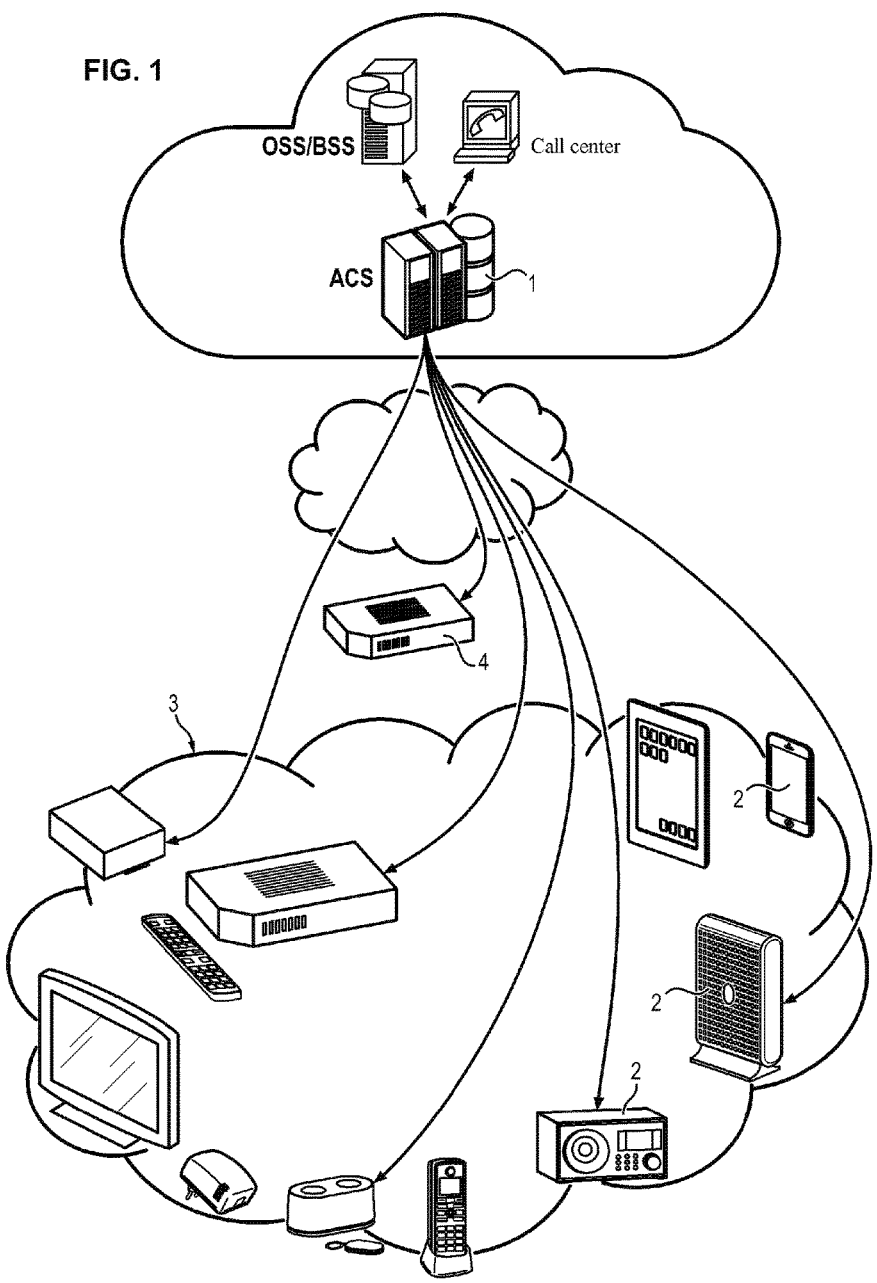
FIG. 1 illustrates an example of an architecture for applying an administration method according to the state of the art.
Figure 2A:
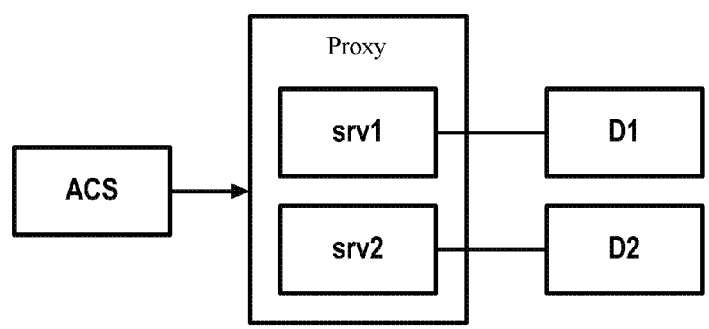
FIGS. 2a and 2b illustrate a proxy model according to an embedded device mechanism according to the state of the art and a model of a local configuration device according to an embodiment of the invention.
Figure 2B:
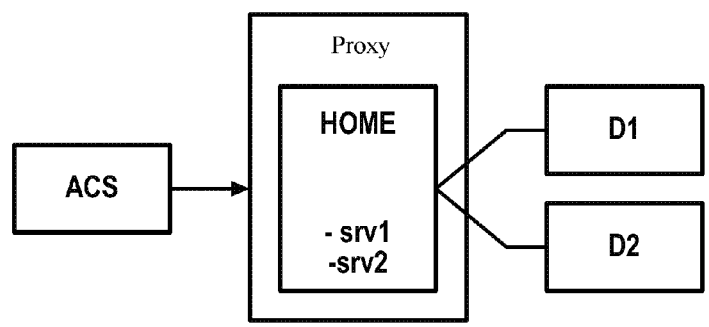

In order to allow the remote configuration device 1 to administer the local network 3 without being directly connected to the local devices of the local network, the local configuration device LACS 5 shows a model of the local network to the remote configuration device ACS 1. Such a model may notably be architectured according to specifications defined in the technical report TR-106 of the Broadband Forum and implemented as a tree-shaped structure in XML language. Such a model shows to the remote configuration device ACS 1 the whole of the local devices (D1, D2) of the local network and of the services (srv1, srv2) which they provide as a single device allowing the remote configuration device ACS 1 to administer a certain number of services which may be executed on the local communications network, as illustrated in FIG. 2b. The model notably comprises the description of these services and allows determination of the commands for administering these services which may be executed by the remote configuration device ACS 1 on the local communications network, so called administration acts, as well of the associated parameters which the remote configuration device ACS 1 may read and/or modify for parameterizing said services on the local network. These parameters also give the possibility to the remote configuration device of being aware of the state of a service. As an example, if the local network comprises a decoder box ("set top box", STB), the model of the local network may comprise fields showing to the remote configuration device ACS 1 the services provided by the decoder box to a user of the local network such as the video decoding capacities, audio decoding and recording capacities of the decoder box. Such a model also comprises other fields exhibiting to the remote configuration device ACS 1 the parameters for administering these services, for some of them only read-accessible, such as service status indicators or signal quality measurements, and for others which may be modified such as operating parameters of the demodulator of the decoder box or parameters for monitoring the operation of the decoder box. In this context, an administration act of the remote configuration device ACS 1 may consist in a command for modifying parameters of the model which are read-accessible for example in order to modify the type of modulation used for demodulating the received signals, to trigger a scan of the channels or activate collection of statistical data. The execution of these administration acts on the local network may both involve only a single local device and require the cooperation of several local devices, without the remote configuration device ACS 1 being informed on the involved local devices 2 or on the actions applied by these devices. The model may also show to the remote configuration device 1 a list of the microcodes installed on at least one local device 2 of the local communications network 3.

Unlike existing administration solutions, the proposed solution gives the possibility to the remote configuration device ACS 1 of administering the whole of the local devices 2 of the local communication network 3 without having to connect to each of them through the gateway 4 of the network. Further, this solution gives the possibility of not having to implement a complex control logic in the remote configuration device 1 even when various local devices 2 have to cooperate for executing an administration act of a service. Indeed, in such a case, the remote configuration device 1 has only to order said administration act to the local configuration device 5 and the complexity of the definition of the multiple commands to be sent to the local devices is offset in the local configuration device LACS 5, which is simpler to apply since the local configuration device 5 is integrated to the local communications network 3 and only participates in the administration of a limited number of devices 2.

The proposed solution also gives the possibility to the remote configuration device 1 of always having a global view of the condition of each service since the local configuration device 5 may provide such a piece of information even if other local devices 2 of the local communication network 3 are switched off or inaccessible.

During the connection to the local communications network 3 of a new local device 2 which may be implied in the execution of at least one administration act of a service, the local configuration device 5 may be configured for updating the model of the local communications network 3, by adding thereto or by updating said administration act as well as the associated parameters. This allows the remote configuration device 1 to determine the new parameters associated with an existing administration act and/or that a new administration command of a service which may be executed on the local communications network 3 is available. If this device includes new microcode, the latter is also added to the list of microcodes shown in the model.

The task of ordering the actions of the local devices 2 of the local network 3 for executing an administration act is therefore the responsibility of the local configuration device LACS 5.

More specifically, following reception, from the remote configuration device ACS 1, of an administration command of a service which may be executed on the local communications network 3, a so called administration act, and included in the data model presented beforehand to the remote configuration device 1, the local configuration device 5 determines for said command, a list of local devices 2 involved in the execution of said administration act.

As an example, the local configuration device 5 may store in memory a correspondence table giving for each proposed administration act in the data model of the local network 3 the local devices 2 involved in the execution of this administration act. The local configuration device 5 may itself appear in the list if it has to perform actions other than the sending of commands for having the administration act executed. The local configuration device 5 may store in memory the association of a microcode with each local device 2 of the local communications network 3, for example in order to determine the relevant devices during updating of a microcode. Such association information is updated upon adding a new device to the local network.

The local configuration device 5 then transmits to each of the local devices 2 from said list, at least one administration command required for executing said administration act on the local communications network 3.

Said administration commands may be commands compliant with the CWMP protocol if the latter is supported by a local device 2 or else with any other communications protocol supported by the local configuration device 5 and a local device 2. The local configuration device 5 plays the role of a proxy for the devices of the local network towards the remote configuration device 1 and may as such integrate all the known means comprised in a proxy server for translating a command expressed according to a first protocol into the communication language of a second protocol.

The proposed administration method may be used for giving the possibility to the remote configuration device 1 of carrying out administration operations of the local network usually allowed by the CWMP protocol i.e.:
configuring a service,
installing and updating of microcodes ("firmware") and of pieces of software ("software"),
tracking the performances,
diagnosing failures.

Configuration of a Service

A first example for applying a method for administering a plurality of local devices 2 is illustrated with reference to FIGS. 4*a* and 4*b*. This first application example illustrates the configuration of a television service on the local communications network.

In order to achieve this configuration, a command for administering a service and more specifically a command for configuring a service ("config TV service") on the local communications network is transmitted by the remote configuration device 1 (ACS).

Figure 4A:
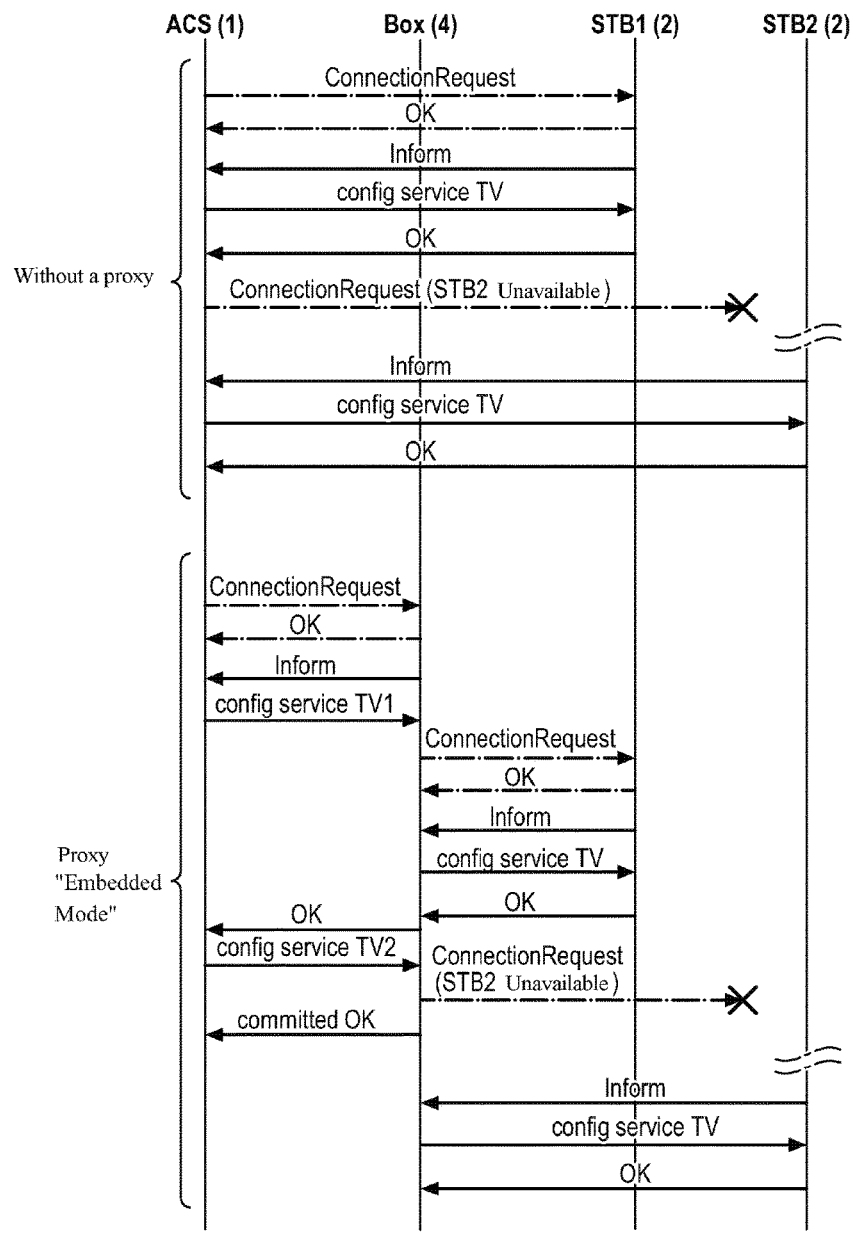
FIGS. 4a and 4b are diagrams schematizing a first example for applying an administration method according to the state of the art and an embodiment of the invention.

As illustrated in FIG. 4*a*, usually this command is directly transmitted by the remote configuration device 1 to each of the local devices 2 involved in the execution of this service (STB1, STB2), separately so that the latter configure this service. In the case when these local devices STB1 and STB2 do not support the CWMP protocol, a proxy ("proxy server") may be inserted between the remote configuration device 1 and each local device 2 which are then only shown to the remote configuration device by the service which they provide, according to the "Embedded device" model. The remote configuration device 1 then successively transmits to the proxy server a command for configuration of each local device. The proxy server then transmits to each local device (STB1, STB2) an administration command configuring the service (TV service) on the local device, said command being obtained by translating the service execution command according to the CWMP protocol into the language of the protocol supported by each local device, for example the UPnP protocol.

Figure 4B:
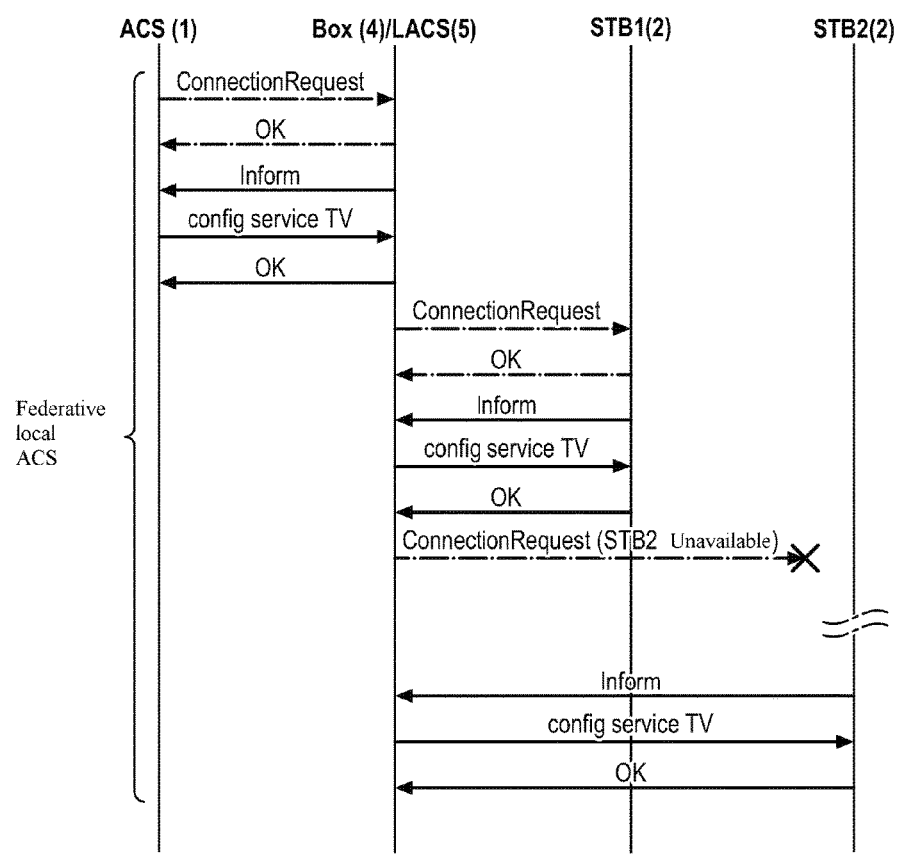

As illustrated in FIG. 4*b*, in an embodiment of the invention, this command is transmitted to the local configuration device 5. Said local configuration device LACS 5 is then configured for:

- determining for said command a list of the local devices 2 to be configured (STB1, STB2),
- transmitting to each of the local devices 2 from the determined list at least one administration command ("TV service config") configuring said service on said local devices 2.

The presence of the local configuration device 5 discharges the remote configuration device 1 and allows it to have only single intermediary while limiting the number of exchanges for achieving such a configuration of a service on the local communications network. Further, transmission to the local devices 2 of the administration commands may be accomplished in a desynchronized way and deferred so that the execution of these commands occur at a more appropriate moment, for example so as not to perturb the delivery of a television service to the user of the local network 3.

Updating Microcode "Firmware" and of a Software Package "Software"

A second exemplary application of a method for administering a plurality of local devices 2 is illustrated with reference to FIGS. 5*a* and 5*b*. This second exemplary application illustrates the updating of microcode "firmware" and of "software" on the local communications network 3.

In order to carry out such an update, an administration command of a service and more specifically a command for updating a piece of software or a microcode ("upgrade") on the local communications network 3 is transmitted by the remote configuration device (ACS) 1.

Figure 5A:
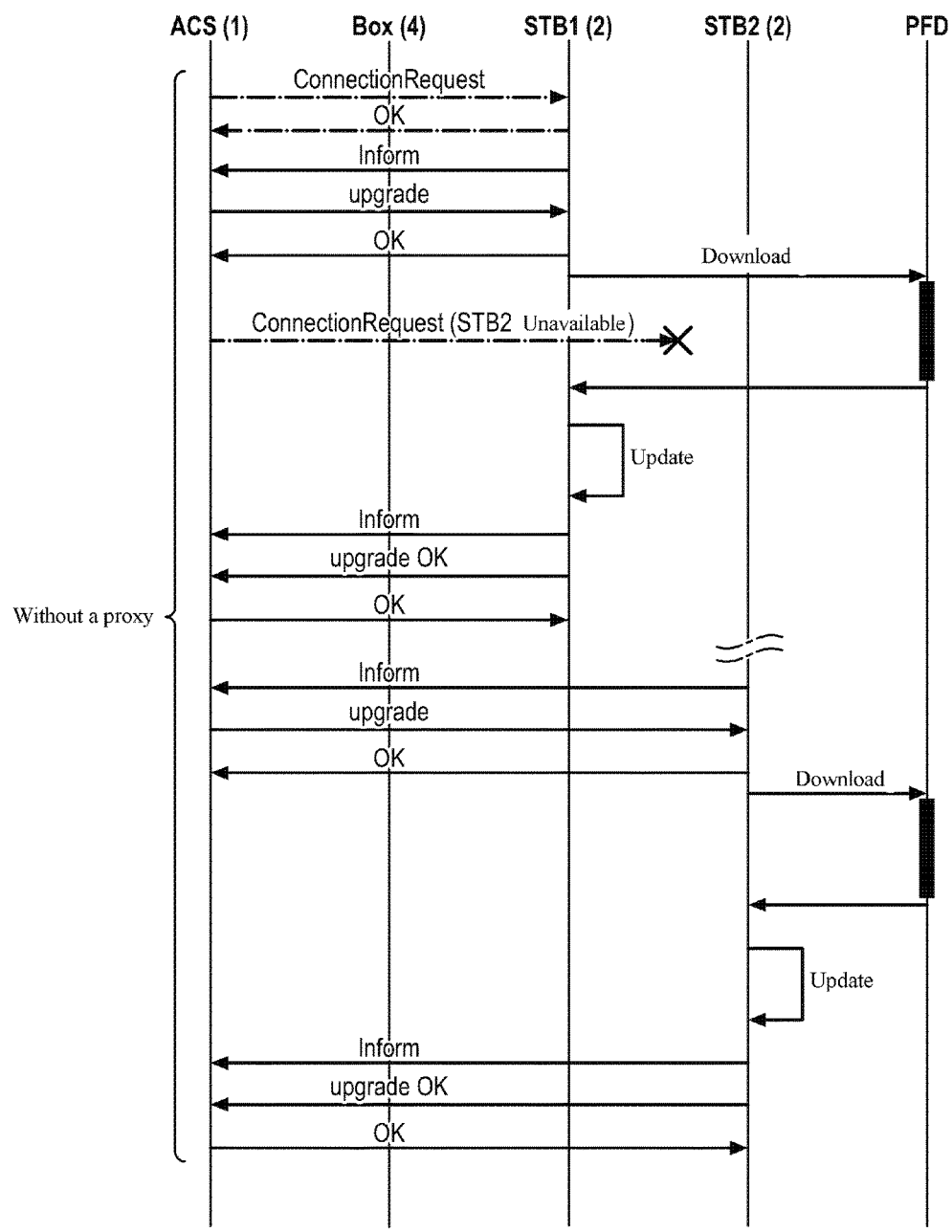

As illustrated in FIG. 5*a*, usually this command ("upgrade") is directly transmitted by the remote configuration device 1 to each of the local devices 2 (STB1, STB2) so that the latter carry out the downloading of the software or of the microcode from a downloading platform (PFD) with view to their updating.

As illustrated in FIG. 5*b*, in an embodiment of the invention, this command is transmitted to the local configuration device 5 so that the remote configuration device 1 only converses with a single intermediary.

Said local configuration device LACS 5 is then configured for:

- determining for said command a list of local devices 2 on which are installed the software or the microcode to be updated (STB1, STB2),
- updating said software or said microcode,
- and transmitting to each of the local devices 2 of said determined list (STB1, STB2) at least one command for updating said software or said microcode.

Each of the local devices 2 may then download and install/update the software or the microcode from said local configuration device 5.

Thus, a single download from the downloading platform is required, reducing the consumed pass band by the whole of the local devices 2.

The local configuration device 5 may use the information associating a microcode with each local device 2 of the local communications network 3, stored beforehand in memory, in order to determine the relevant local devices 2 by the updating of a particular microcode.

The downloading of said software or said microcode by the local configuration device 5 or by the local devices 2 may be accomplished when the latter have the required pass band or outside periods of use of these devices in order to achieve updates without disturbing the users ("silent upgrade").

Alternatively, the decision of applying an update may be left as an option of the local network 3 itself instead of being controlled by the remote configuration device 1. The local configuration device 5 may then comprise means allowing it to monitor the making available of an update of a microcode installed on one or several local devices 2 of the local communications network 3. Subsequently to the detection of the availability of such an update, the local configuration device 5 then executes the actions described above for determining the relevant local devices 2, for downloading and sending updating commands to the local devices.

Tracking the Performances and Diagnosing Failures

The administration act of a service controlled by the remote configuration device 1 to the local configuration device 5 may be a command for tracking the performances of the local network or for diagnosing a failure taking place in the latter.

The local configuration device 5 may then be configured for sending to the local devices 2 of the local communications network administration commands allowing it to poll these devices in order to obtain information characterizing the condition of the devices of the local network. This information allows the local configuration device 5 to estimate the performances of the network, for example towards the execution of a service, and to diagnose a failure which may affect one or several ones of the local devices. Such information may for example consist in measurements of throughput, response times, availability condition, physical parameters such as temperatures or speeds of rotation of fans, possible error codes consecutive to the execution of a command etc.

As an example, an operator may wish to set into place monitoring of the connectivity problems in the local network 3 and periodically obtain a report on this subject, for example subsequent to signally by a user of operating faults. The remote configuration device 1 then transmits to the local configuration device 5 a command for configuring one or several monitoring mechanisms and for a report proposed in the model of the local network 3. Such commands may consist in the modification of the values of various parameters of the model coding the activation of diagnostic tests of the condition of the network and coding the period during which such tests are carried out. In reaction to these commands, the local configuration device 5 determines the administration commands to be sent to the local devices 2 for executing the administration acts ordered by the remote configuration device 1. Depending on the local devices 2, the local configuration device 5 may decide:

- not to carry out any additional action since it is already in regular communication with these local devices and has the necessary information concerning them,
- to modify the frequency at which it communicates with certain local devices,
- to periodically attempt to join up with certain local devices in order to itself ensure that they are available,
- to send to certain local devices an administration command asking them to send at regular intervals a connectivity report.

Management of Complex Services

Since the administration acts discussed in the data model may require for their execution the joint action of several local devices 2 of the local communications network 3, the proposed method may be used for controlling the execution of complex administration acts on the whole of the local network 3, without requiring complex implementation on the side of the remote configuration device.

As an example, the local configuration device may be used for proposing to a user a remote administration platform allowing him to administer a home automation service in a dwelling as illustrated in FIG. 6b. Within the scope of a home automation network, the local devices consist in sensors, switches, an alarm . . . . These devices may be actuated and collect monitoring data.

Unlike a conventional use of CWMP, illustrated in FIG. 6a and in which the remote configuration device 1 has to be separately connected to each of the local devices 2, a local configuration device 5 may be integrated into the gateway of the network or into a HAB ("Home Automation Box") server as illustrated in FIG. 6b. The local configuration device 5 has in the model of the local network 3 parameters giving the possibility of consulting operating statistics of the local devices, of checking the condition of the whole of the sensors, and of controlling the execution of administration acts such as activation or deactivation of the control of the shutters by the home automation service. Consequently, the administration portal hosted on the remote configuration device 1 is much simpler to make in the alternative discussed in FIG. 6a since the remote configuration device 1 is only connected to the HAB server and does not have to control the execution of administration commands on several devices simultaneously.

The invention claimed is:

1. A method for administering a plurality of local devices connected to a local communication network wherein the method is carried out by a local configuration device LACS configured to be connected to the local communications network and to remote configuration device ACS, the method comprising:
receiving from the remote configuration device ACS a command for administering an administration act, wherein the administration act comprises a service which may be executed on the local communications network;
following reception from the remote configuration device of the said command, determining for the command a list of local devices involved in the execution of the administration act, the said administration act being included in a model of the local communication network;
transmitting to each of the local devices of the determined list at least one administration command for executing the administration act on the local communications network;
said local configuration device LACS making available to the remote configuration device ACS, the model of the local communications network giving the possibility to the remote configuration device ACS of determining administration acts for services which may be executed on the local communications network, and associated parameters; and
wherein said model shows to the remote configuration device ACS the whole of the local devices of the local network and of the services provided as a single local device.

2. The administration method according to claim 1, wherein said local configuration device LACS associates a microcode with each local device of the local communications network.

3. The administration method according to claim 1, wherein during the connection to the local communication network of a new local device which may be involved in the execution of at least one administration act, said local configuration device LACS updates the model of the local communication network in order to allow the remote configuration device ACS to have an update of the administration acts for the services which may be executed on the local communications network and associated parameters.

4. The administration method according to claim 1, wherein the execution of the administration act triggers an installation or an update of a piece of software or a microcode, a configuration of a service, a monitoring of the condition of the performances and/or a diagnostic of a failure of one or several local devices of the local communications network.

5. The administration method according to claim 1, wherein when the administration act for a service comprises a command for installing or updating a piece of software or a microcode on the local communications network, said local configuration device LACS downloads said piece of software or said microcode, and said at least one administration command required for executing said administration act comprises a command for downloading from said local configuration device and for installing said piece of software or said microcode, transmitted to the local devices on which installation or updating of said piece of software or said microcode is required.

6. The administration method according to claim 1, wherein when the administration act for a service comprises a command for configuring a service, said at least one administration command required for executing said administration act comprises an administration command configuring said service on the local devices from the determined list.

7. The administration method according to claim 1, wherein the connection between the local configuration device LACS and the remote configuration device ACS is secured.

8. The administration method according to claim 1, wherein the local configuration device LACS is integrated into a gateway of the local communications network.

9. A non-transitory computer-readable medium having stored thereon instructions which cause a processor to perform a method for administering a plurality of local devices according to claim 1 when said instructions are executed by a processor.

10. A local configuration device LACS configured to be connected to a local communication network and to a remote configuration device ACS, comprising:
a programmable processor connected to a memory system, wherein the memory system comprises instructions executable by the programmable processor, wherein the instructions, when executed by the programmable processor, cause the system to:
receive from the remote configuration device ACS a command for administering an administration act, wherein said administration act comprises a service which may be executed on the local communications network;
following reception from the remote configuration device of the said command, determine for said command a list of the local devices involved in the execution of said administration act, the said administration act being included in a model of the local communications network;
transmit to each of the local devices from said determined list at least one administration command required for executing said administration act on the local communications network;

said local configuration device LACS making available to the remote configuration device ACS, the model of the local communications network giving the possibility to the remote configuration device ACS of determining administration acts for services which may be executed on the local communications network, and associated parameters; and wherein said model shows to the remote configuration device ACS the whole of the local devices of the local network and of the services provided as a single local device.

11. A gateway device configured to be connected to a local communications network and comprising a local configuration device LACS according to claim 10.

* * * * *